(12) United States Patent
Arndt (10) Patent No.: US 6,990,663 B1
(45) Date of Patent: Jan. 24, 2006

(54) HYPERVISOR VIRTUALIZATION OF OS CONSOLE AND OPERATOR PANEL

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 09/589,661

(22) Filed: Jun. 8, 2000

(51) Int. Cl.
*G06F 9/455* (2006.01)
*G06F 9/46* (2006.01)
*G06F 12/00* (2006.01)

(52) U.S. Cl. .............................. 718/1; 718/104; 711/6
(58) Field of Classification Search ................ 718/1, 718/100–108, 100–10; 711/6
See application file for complete search history.

(56) References Cited

U.S. PATENT DOCUMENTS

| | | | |
|---|---|---|---|
| 5,414,851 A | 5/1995 | Brice, Jr. et al. | 395/650 |
| 6,075,938 A * | 6/2000 | Bugnion et al. | 703/27 |
| 6,339,713 B1 * | 1/2002 | Hansson et al. | 455/574 |
| 2002/0010844 A1 * | 1/2002 | Noel et al. | 711/153 |
| 2002/0016892 A1 * | 2/2002 | Zalewski et al. | 711/153 |
| 2002/0099752 A1 * | 7/2002 | Markos et al. | 709/1 |

FOREIGN PATENT DOCUMENTS

| | | |
|---|---|---|
| EP | 0 543 610 A2 | 5/1993 |
| EP | 0 574 691 A1 | 12/1993 |
| EP | 0 574 691 B1 | 12/1993 |
| JP | 63-142424 | 6/1988 |
| JP | 05-151003 | 6/1993 |
| JP | 06-035725 | 2/1994 |
| JP | 06-110717 | 4/1994 |
| JP | 07-105030 | 4/1995 |

OTHER PUBLICATIONS

Wilmot, Richard, "Re: The Intel '586 and self-virtualizing", Jun. 19, 1992, Google Groups, Newsgroups: comp.arch.*

* cited by examiner

*Primary Examiner*—Meng-Al T. An
*Assistant Examiner*—Kenneth Tang
(74) *Attorney, Agent, or Firm*—Duke W. Yee; Mark E. McBurney; Francis Lammes (57) ABSTRACT

A logically partitioned data processing system in which shared resources are emulated to provide each partition a separate copy of the shared resource is provided. In one embodiment, the logically partitioned data processing system includes a plurality of logical partitions, a plurality of operating systems executing within the data processing system and a plurality of assignable resources. Each of the plurality of operating systems is assigned to a separate one of the plurality of logical partitions, such that no more than one operating system is assigned to any given logical partition. Each of the plurality of assignable resources is assigned to a single one of the plurality of logical partitions. The logically partitioned data processing system also includes a hypervisor. The hypervisor emulates shared resources, such as an operator panel and a system console, and provides a virtual copy of these shared resources to each of the plurality of logical partitions.

14 Claims, 6 Drawing Sheets

FIG. 6B

# HYPERVISOR VIRTUALIZATION OF OS CONSOLE AND OPERATOR PANEL

BACKGROUND OF THE INVENTION

1. Technical Field

The present invention relates generally to the field of computer architecture and, more specifically, to methods and systems for allowing multiple operating system images within a logically partitioned data processing system to interact with a console and operator panel.

2. Description of Related Art

A logical partitioning option (LPAR) within a data processing system allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

There are certain resources within many server platforms that exist singly, yet each distinct OS within the platform must interact with these resources. For example, the RS/6000, a product of International Business Machines Corporation of Armonk, N.Y., includes a console and an operator panel for allowing a system administrator to detect and correct problems within the platform. However, each of these resources exists singly within the platform and it is impractical to duplicate these resources. While present architectures often do not preclude the sharing of allocable resources of this type between partitions, there is no current architectural support for such sharing. Therefore, a method, system, and computer program product for providing the sharing of allocable resources within a logically partitioned platform is desirable.

SUMMARY OF THE INVENTION

The present invention provides a logically partitioned data processing system in which shared resources are emulated to provide each partition a separate copy of the shared resource. In one embodiment, the logically partitioned data processing system includes a plurality of logical partitions, a plurality of operating systems executing within the data processing system and a plurality of assignable resources. Each of the plurality of operating systems is assigned to a separate one of the plurality of logical partitions, such that no more than one operating system is assigned to any given logical partition. Each of the plurality of assignable resources is assigned to a single one of the plurality of logical partitions. The logically partitioned data processing system also includes a hypervisor. The hypervisor emulates shared resources, such as an operator panel and a system console, and provides a virtual copy of these shared resources to each of the plurality of logical partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
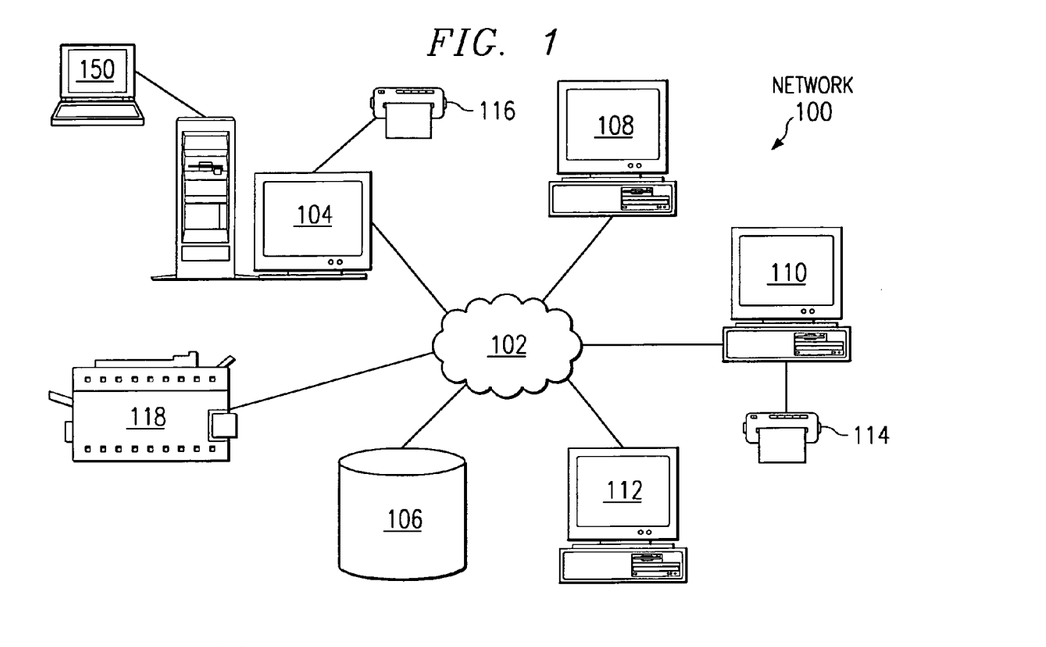
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
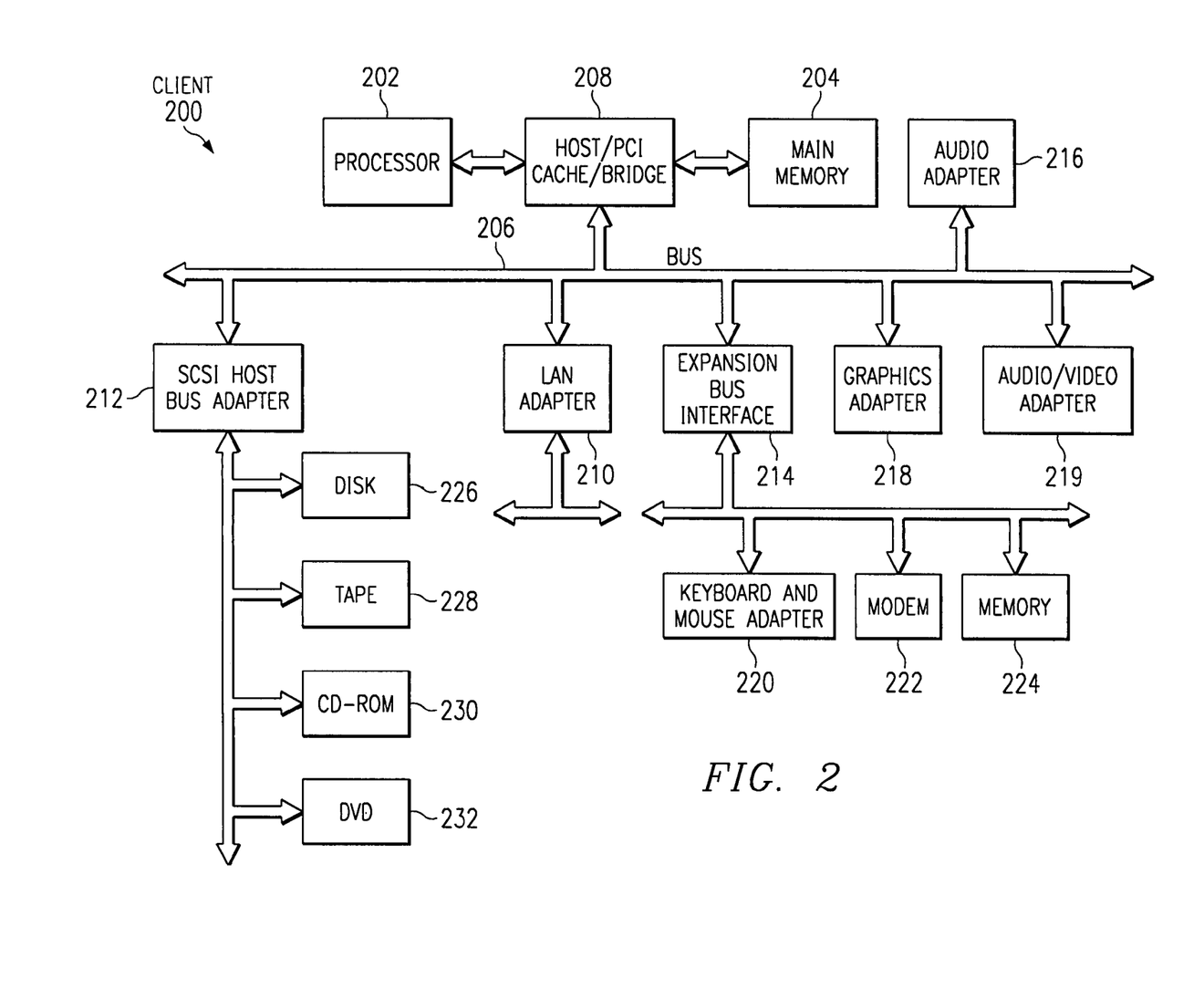
FIG. 2, a block diagram of a data processing system in accordance with the present invention is illustrated.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by a direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
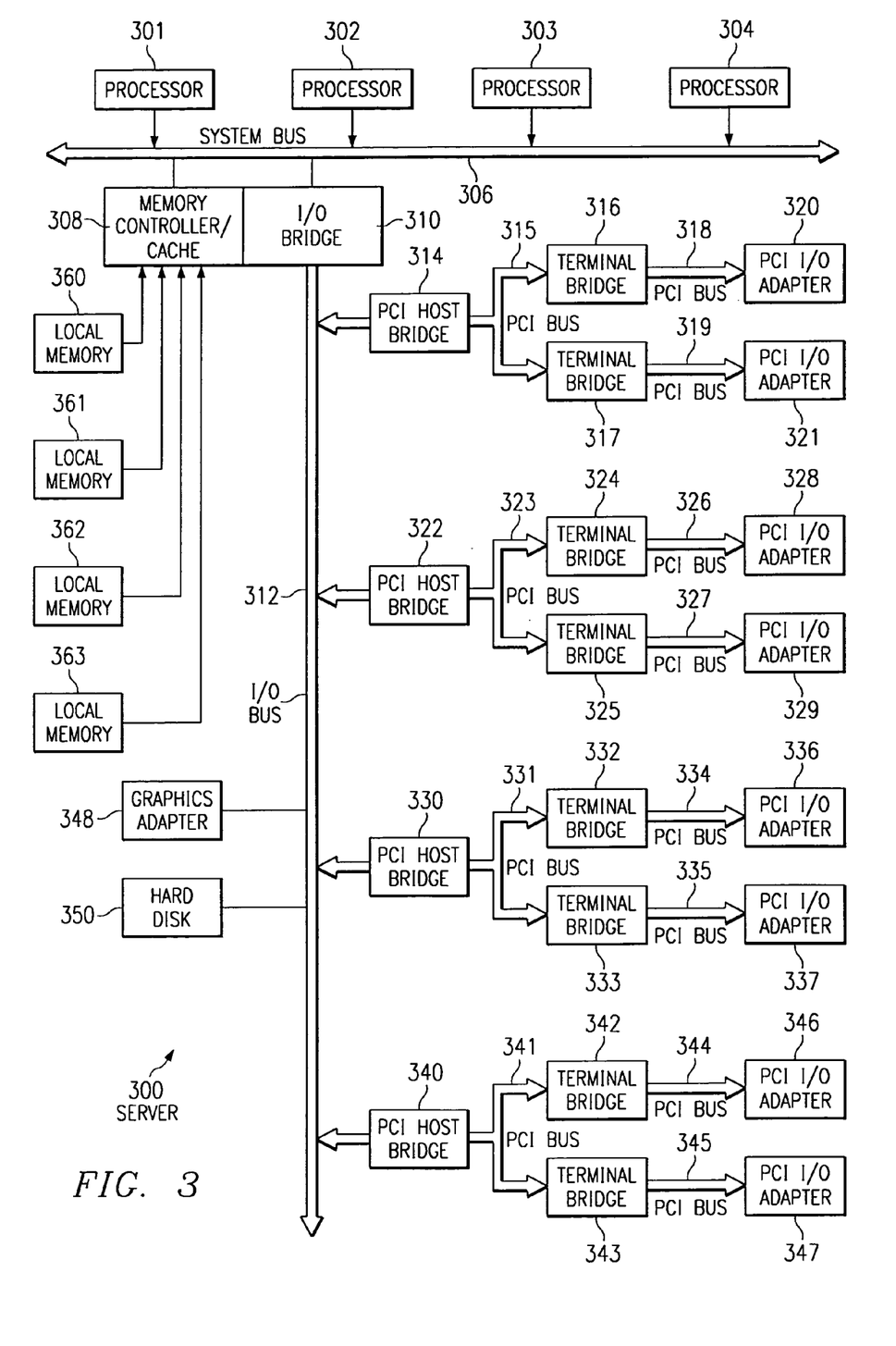
FIG. 3 depicts a block diagram of a data processing system, which may be implemented as a logically partitioned server, in accordance with the present invention.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–363 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 314 connected to I/O bus 312 provides an interface to PCI local bus 315. A number of Terminal Bridges 316–317 may be connected to PCI bus 315. Typical PCI bus implementations will support four Terminal Bridges for providing expansion slots or add-in connectors. Each of Terminal Bridges 316–317 is connected to a PCI/I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343 which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
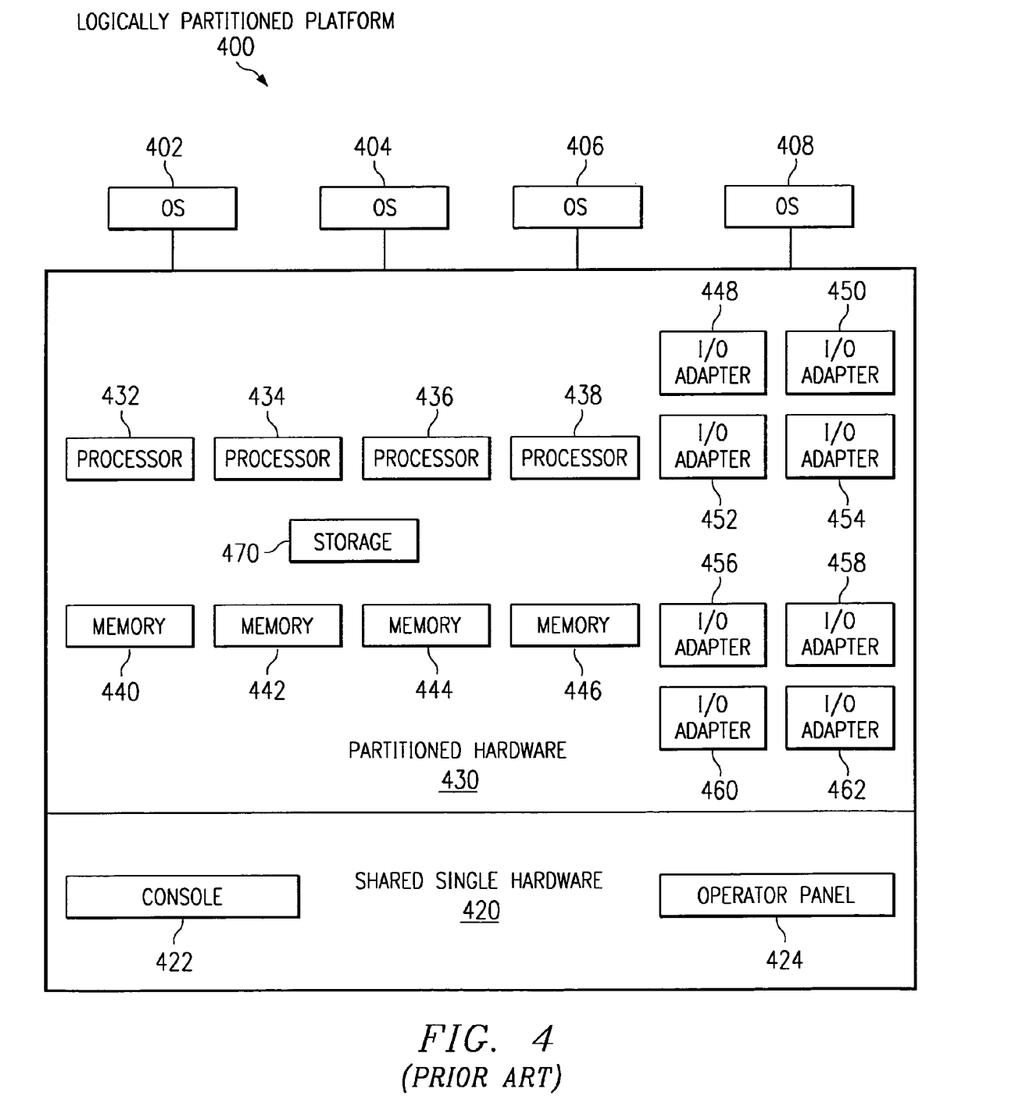
FIG. 4 depicts a block diagram illustrating a prior art logically partitioned platform in accordance with the present invention.

With reference now to FIG. 4, a block diagram illustrating a prior art logically partitioned platform is depicted in accordance with the present invention. Logically partitioned platform 400 is an example of a platform that, in prior art systems, may have been implemented as server 104 in FIG. 1. Logically partitioned platform 400 includes partitioned hardware 430, shared single hardware 420, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Shared single hardware unit 420 includes console 422 and operator panel 424. Shared single hardware unit 420 may also include other shared devices not depicted in FIG. 4. Console 422 typically includes a display and data entry device such as a keyboard. Console 422 allows an operator to respond to and correct errors displayed on operator panel 424. Operator panel 424 is typically a panel display, such as an LCD display, on the front of the physical chassis of the server in which text messages are displayed alerting an operator of potential problems within platform 400 or within a particular OS 402–408 running on platform 400.

Each operating system image 402–408 must share access to resources within shared single hardware 420. Therefore, some of the benefits of a logically partitioned platform are lost, since each partition may access and change the contents of shared resources, thus affecting other partitions within the platform. One alternative to allowing each partition to share access to shared single hardware 420 is to duplicate these hardware devices and have a separate operator panel and console for each partition. However, such a solution is bulky and, often cost prohibitive.

Figure 5:
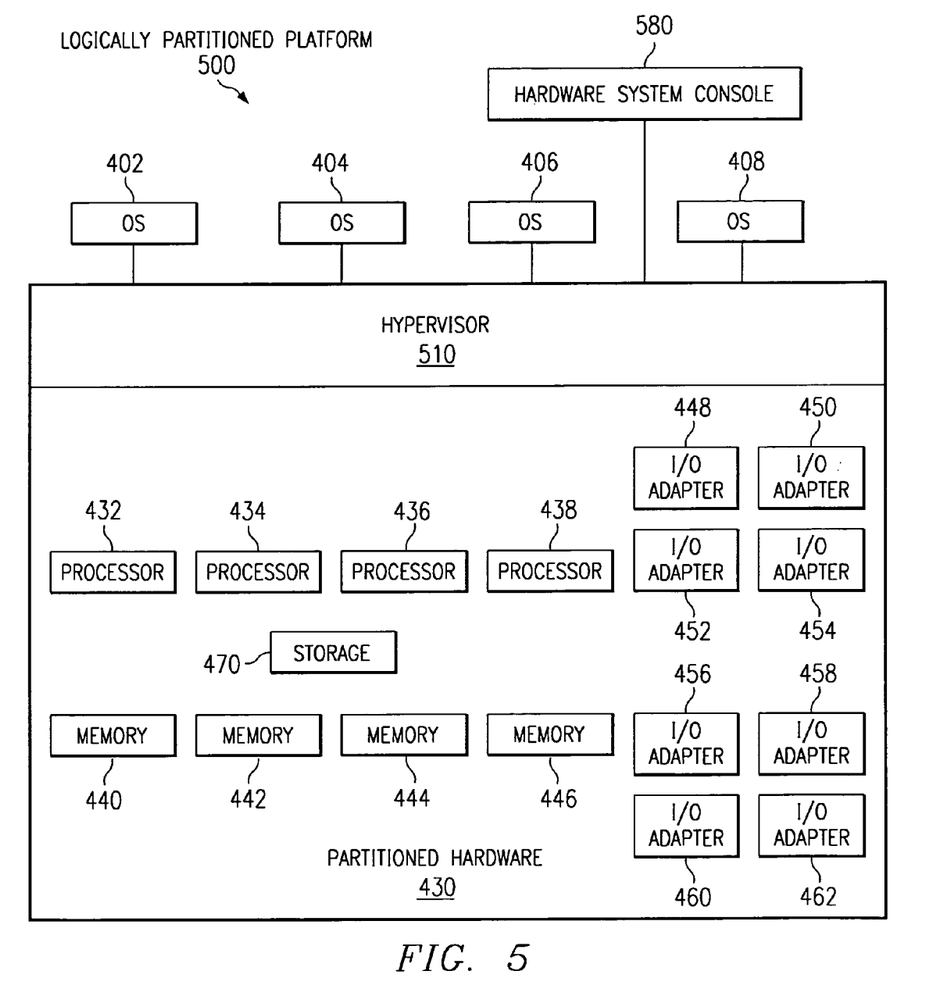
FIG. 5 depicts a block diagram of a logically partitioned platform in which the present invention may be implemented.

With reference now to FIG. 5, a block diagram of an exemplary logically partitioned platform is depicted in which the present invention may be implemented. The hardware in logically partitioned platform 500 may be implemented as, for example, server 200 in FIG. 2. Logically partitioned platform 500 is similar to logically partitioned platform 400 in FIG. 4. However, Hypervisor 510, implemented as firmware, has been added. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Hypervisor 510 provides the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 510 encapsulates the data from the various OS images onto a message stream that is transferred to a computer 580, known as a hardware system console 580.

Hardware system console 580 is connected directly to logically partitioned platform 500 as illustrated in FIG. 5, or may be connected to logically partitioned platform through a network, such as, for example, network 102 in FIG. 1. Hardware system console 580 may be, for example, a desktop or laptop computer, and may be implemented as data processing system 200 in FIG. 2. Hardware system console 580 decodes the message stream and displays the information from the various OS images 402–408 in separate windows, at least one per OS image. Similarly, keyboard input information from the operator is packaged by the hardware system console, sent to logically partitioned platform 500 where it is decoded and delivered to the appropriate OS image via the hypervisor 510 emulated port device driver associated with the then active window on the hardware system console 580.

Those of ordinary skill in the art will appreciate that the hardware and software depicted in FIG. 5 may vary. For example, more or fewer processors and/or more or fewer operating system images may be used than those depicted in FIG. 5. The depicted example is not meant to imply architectural limitations with respect to the present invention.

Figure 6A:
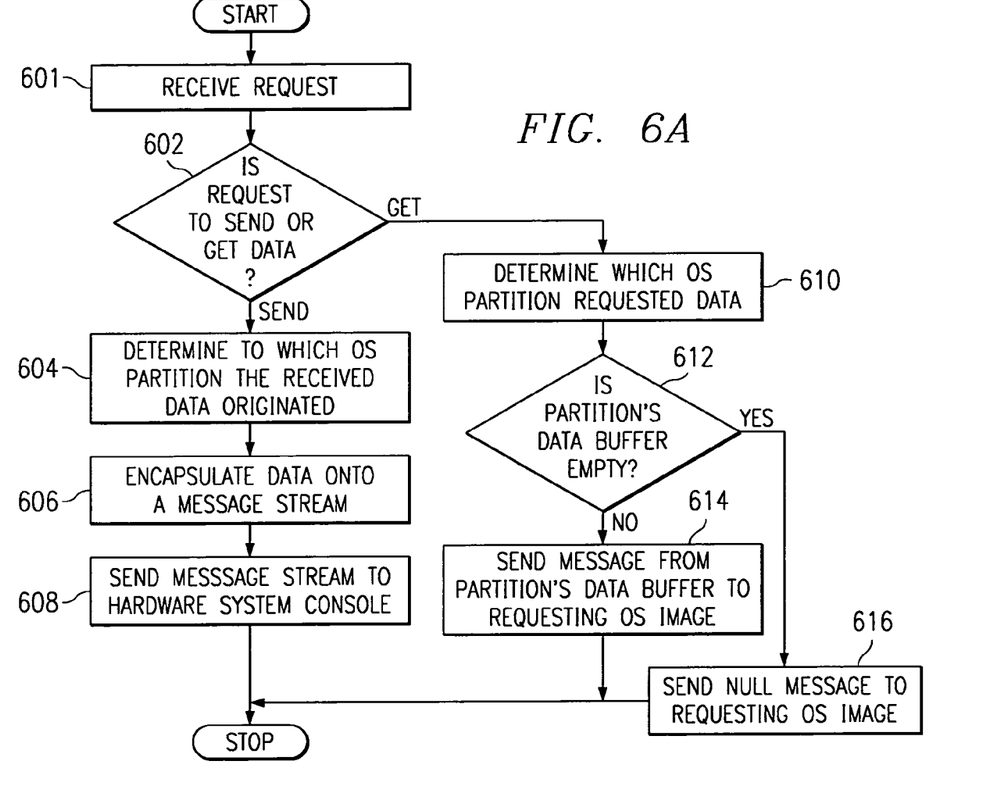
FIGS. 6A–6B depict high-level flowcharts illustrating exemplary processes, performed for example, in hypervisor 510, for emulating a console and operator platform in accordance with the present invention.
Figure 6B:
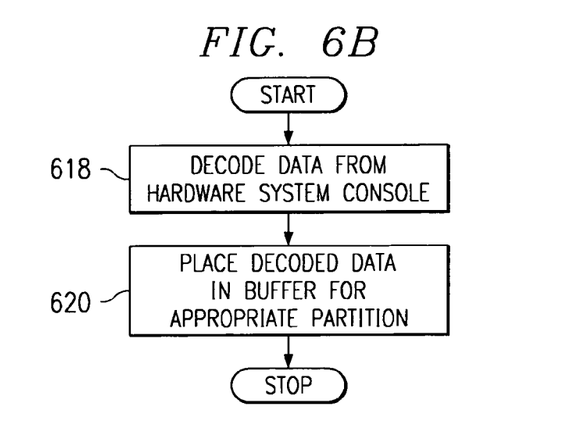

With reference now to FIGS. 6A–6B, high-level flowcharts illustrating exemplary processes, performed for example, in hypervisor 510, for emulating a console and operator platform is depicted in accordance with the present invention. The operating systems, such as, for example, OS 402–408 in FIG. 4, call the hypervisor through a single entry point. One thread of execution illustrated in FIG. 6A gets data from a per partition buffer and sends data to the hardware system console while a separate thread of execution illustrated in FIG. 6B receives data from the hardware system console.

In the first thread of execution depicted in FIG. 6A, the hypervisor receives a request from an operating system to get or send data (step 601). The hypervisor determines whether the request is a request to send or get data (step 602). If the request is a request to send data, then the hypervisor determines from which OS image (partition) the received data originated (step 604). The received data is then encapsulated onto a message stream (step 606). The encapsulated data includes the message or information received from the OS as well as the identity of the OS. The hypervisor then sends the message stream to the hardware system console (step 608).

If the request is a request to get data, then the hypervisor determines which OS partition requested the data (step 610). Each partition is assigned a data buffer for storing data received from the hardware system console until retrieved by the partition's OS. Thus, the hypervisor determines whether the requesting partition's data buffer is empty (step 612). If the data buffers for the requesting partition is empty, then the hypervisor sends a NULL message to the requesting OS image indicating that there is no data from the hardware system console for the OS image to receive (step 616). If the data buffer is not empty, then the message data from the partition's data buffer is sent to the requesting OS image (step 614).

In the second thread of execution depicted in FIG. 6B, the hypervisor receives and decodes data from the hardware system console (step 618). The hypervisor then places the decoded data into the buffer corresponding to the appropriate partition such that it may be retrieved and sent to the appropriate partition's OS image upon request (step 620).

Figure 7:
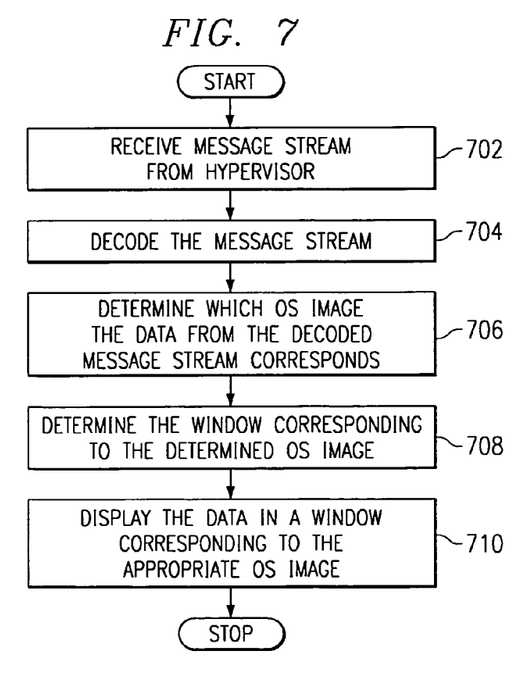
FIG. 7 depicts a high level flowchart illustrating an exemplary process on a hardware system console for presenting the information from the various OS images to an operator in accordance with the present invention.

With reference now to FIG. 7, a high level flowchart illustrating an exemplary process on a hardware system console for presenting the information from the various OS images to an operator is depicted in accordance with the present invention. To begin, the hardware system console receives a message stream from the hypervisor (step 702). The hardware system console decodes the message stream (step 704) and determines to which OS image the received data corresponds (step 706). Next, the hardware system console determines which window within the display corresponds to the determined OS image (step 708) and displays the received data to an operator in the window corresponding to the proper OS image (step 710).

Figure 8:
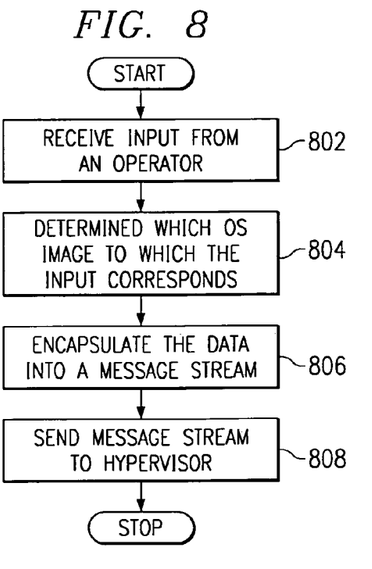
FIG. 8 depicts a high level flowchart illustrating an exemplary process on a hardware system console for sending messages to various ones of multiple OS images running on a logically partitioned platform in accordance with the present invention.

With reference now to FIG. 8, a high level flowchart illustrating an exemplary process on a hardware system console for sending messages to various ones of multiple OS images running on a logically partitioned platform is depicted in accordance with the present invention. To begin, the hardware system console receives input from an operator from an input device, such as, for example, a keyboard (step 802). The hardware system console then determines which OS image corresponds to the active window from which the input was received (step 804). The data input, along with the OS image it corresponds with, are encapsulated into a message stream (step 806). The message stream is then sent to the hypervisor (step 808).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logically partitioned data processing system, comprising:
 a plurality of logical partitions;
 a plurality of operating systems, each assigned to a separate one of the plurality of logical partitions;
 a plurality of assignable resources, wherein each of the plurality of assignable resources is assigned to one of the plurality of logical partitions;
 a hypervisor, wherein the hypervisor emulates shared resources and provides a virtual copy of the shared resources to each of the plurality of logical partitions, wherein the hypervisor receives a system message from one of the plurality of operating systems, appends an operating system identity to the message to produce a new message, and sends the new message to an external data processing system.

2. The logically partitioned data processing system as recited in claim 1, wherein the shared resources comprise an operator panel.

3. The logically partitioned data processing system as recited in claim 1, wherein the shared resources comprise a system console.

4. The logically partitioned data processing system as recited in claim 1, wherein instructions for executing the hypervisor are contained within firmware.

5. The logically partitioned data processing system as recited in claim 4, wherein the firmware comprises a read-only memory.

6. The logically partitioned data processing system as recited in claim 4, wherein the firmware comprises a programmable read-only memory.

7. The logically partitioned data processing system as recited in claim 4, wherein the firmware comprises an erasable programmable read-only memory.

8. The logically partitioned data processing system as recited in claim 4, wherein the firmware comprises an electrically erasable programmable read-only memory.

9. The logically partitioned data processing system as recited in claim 4, wherein the firmware comprises a non-volatile random access memory.

10. A method of allocating resources in a logically partitioned data processing system, comprising:

assigning non-overlapping subsets of resources to one of a plurality of partitions;

executing a plurality of operating systems, wherein each of the plurality of operating systems is respectively assigned to one of the plurality of partitions;

emulating a hardware resource that is shared with the plurality of operating systems, wherein the hardware resource is not included in any of the subsets of resources;

receiving a system message from one of the plurality of operating systems;

appending an operating system identity to the message to produce a new message, and sending the new message to an external data processing system.

11. The method of claim 10, wherein the step of emulating farther comprises:

providing an interface to the hardware resource as an emulated port device driver.

12. The method of claim 10, wherein the step of emulating further comprises:

providing a respective virtual copy of the hardware resource to each of the plurality of partitions.

13. The method of claim 10, wherein the step of emulating further comprises:

virtualizing the hardware resource by a firmware device.

14. The method of claim 13, wherein the step of virtualizing further comprises;

performing firmware calls that emulate a port device driver.

* * * * *